(12) United States Patent
Krauss et al.

(10) Patent No.: US 12,241,773 B2
(45) Date of Patent: Mar. 4, 2025

(54) APPARATUS AND METHOD FOR WEIGHING PHARMACEUTICAL CONTAINERS NESTED IN A CARRIER

(71) Applicant: Syntegon Technology GmbH, Waiblingen (DE)

(72) Inventors: Ulrich Krauss, Ilshofen (DE); Olaf Busch, Crailsheim-Jagstheim (DE)

(73) Assignee: Syntegon Technology GmbH, Waiblingen (DE)

( * ) Notice: Subject to any disclaimer, the term of this patent is extended or adjusted under 35 U.S.C. 154(b) by 364 days.

(21) Appl. No.: 17/631,233

(22) PCT Filed: Apr. 29, 2020

(86) PCT No.: PCT/EP2020/061921
§ 371 (c)(1),
(2) Date: Jan. 28, 2022

(87) PCT Pub. No.: WO2021/018428
PCT Pub. Date: Feb. 4, 2021

(65) Prior Publication Data
US 2022/0299356 A1    Sep. 22, 2022

(30) Foreign Application Priority Data
Aug. 1, 2019 (DE) .............. 10 2019 211 568.3

(51) Int. Cl.
*G01G 15/04*        (2006.01)
*B65B 3/00*         (2006.01)
(Continued)

(52) U.S. Cl.
CPC ............. *G01G 15/04* (2013.01); *B65B 3/003* (2013.01); *B65B 3/28* (2013.01); *G01G 13/248* (2013.01); *G01G 21/22* (2013.01); *G01G 23/14* (2013.01)

(58) Field of Classification Search
CPC ............ G01G 15/04; B65B 3/003; B65B 3/28
(Continued)

(56) References Cited

U.S. PATENT DOCUMENTS 6,719,141 B2 *  4/2004  Heinz ...................... B01L 9/06
                                                       206/443
9,963,259 B2    5/2018  Deutschle et al.
(Continued)

FOREIGN PATENT DOCUMENTS

CN        1457318 A       11/2003
CN      101776475 A        7/2010
(Continued)

OTHER PUBLICATIONS

European Patent Office Action for Related Application No. 20723107.7 dated Nov. 28, 2022 (10 pages, including an English translation).
(Continued)

*Primary Examiner* — Jacques M Saint Surin
(74) *Attorney, Agent, or Firm* — Michael Best & Friedrich LLP

(57) ABSTRACT

The invention relates to an apparatus and a method for weighing pharmaceutical containers (19) nested in a carrier (18), wherein the apparatus comprises at least one weighing device (22) and at least one receptacle (20) for the carrier (18) of the containers (19), wherein the receptacle (20) is connected to the weighing station (22) for weight detection.

16 Claims, 2 Drawing Sheets

(51) Int. Cl.
  *B65B 3/28* (2006.01)
  *G01G 13/24* (2006.01)
  *G01G 21/22* (2006.01)
  *G01G 23/14* (2006.01)
(58) Field of Classification Search
  USPC .............................................................. 177/1
  See application file for complete search history.

(56) References Cited

U.S. PATENT DOCUMENTS

| | | | | |
|---|---|---|---|---|
| 10,737,810 | B2 * | 8/2020 | Franke | B65B 3/28 |
| 10,781,002 | B2 * | 9/2020 | Broadbent | B65B 55/027 |
| 11,047,727 | B2 * | 6/2021 | Trebbi | B65G 47/90 |
| 11,518,555 | B2 * | 12/2022 | Broadbent | B65B 55/027 |
| 11,885,665 | B1 * | 1/2024 | Krauß | B65B 7/2821 |
| 2005/0060962 | A1 * | 3/2005 | Rothbauer | B65B 3/003 |
| | | | | 53/471 |
| 2005/0194059 | A1 | 9/2005 | Py | |
| 2013/0174520 | A1 | 7/2013 | Tessier et al. | |

FOREIGN PATENT DOCUMENTS

| | | | | |
|---|---|---|---|---|
| CN | 102470933 | A | 5/2012 | |
| CN | 102947185 | A | 2/2013 | |
| CN | 103189276 | A | 7/2013 | |
| CN | 203128165 | U | 8/2013 | |
| CN | 203241119 | U | 10/2013 | |
| CN | 104709487 | A | 6/2015 | |
| CN | 106467179 | A | 3/2017 | |
| CN | 107416242 | A | 12/2017 | |
| CN | 107810392 | A | 3/2018 | |
| CN | 207467027 | U | 6/2018 | |
| CN | 108792057 | A | 11/2018 | |
| CN | 109791069 | A | 5/2019 | |
| CN | 113167634 | * | 7/2021 | B01L 9/06 |
| DE | 102005014116 | A1 | 9/2006 | |
| DE | 102014214693 | A1 * | 1/2016 | B65B 3/003 |
| DE | 102016207600 | A1 | 11/2017 | |
| DE | 102017207255 | A1 | 10/2018 | |
| EP | 2949353 | B1 | 10/2017 | |
| EP | 3342719 | A1 * | 7/2018 | B65B 1/46 |
| JP | 2007091249 | A | 4/2007 | |
| WO | 2011000606 | A1 | 1/2011 | |
| WO | 2018019985 | A1 | 2/2018 | |
| WO | 2020240601 | A2 | 12/2020 | |

OTHER PUBLICATIONS

Chinese Patent Office Action for Application No. 2020800542742 dated Aug. 30, 2023, (22 pages including English translation).
Translation of International Search Report for Application No. PCT/EP2020/061921 dated Aug. 20, 2020 (2 pages).
English translation of International Preliminary Report on Patentability for Application No. PCT/EP2020/061921 dated Feb. 10, 2022 (7 pages).
Zinsserna, "Tools for Zinsser Automated Platforms Weighing", https://web.archive.org/web/20190516175859/http://zinsserna.com/tools_weighing.htm, May 16, 2019 (May 16, 2019), (3 pages).
Canadian Patent Office Action for Application No. 3146200 dated Jan. 10, 2024 (4 pages).
Ma Liangjue et al., Strain Electric Measurement and Sensing Technology, China Metrology Press, dated Nov. 30, 1993, p. 426-430 (8 pages including English statement of relevance).
Yang Dongfang et al., The Application and Research of Mathematical Modelsin Ecology (30), Ocean Press, dated May 31, 2015, p. 99-103 (8 pages including English statement of relevance).
Chinese Patent Office Action and Search Report for Application No. 202080054274.2 dated Mar. 19, 2024, (21 pages including English translation).
Chinese Patent Office Decision of Rejection for Application No. 202080054274.2 dated Sep. 10, 2024 (19 pages including English machine translation).

* cited by examiner

APPARATUS AND METHOD FOR WEIGHING PHARMACEUTICAL CONTAINERS NESTED IN A CARRIER

BACKGROUND

The present invention relates to an apparatus and a method for weighing pharmaceutical containers nested in a carrier.

A problem that often arises in the mass manufacture of pharmaceutical products is that appropriate pharmaceutical containers or vessels, for example syringes, ampoules, cartridges, vials, or the like, have to be provided and filled in sterile form and the filling quantity thereof has to be checked.

An apparatus of the type in question for weighing pharmaceutical containers nested in a carrier is known from DE 102016207600 A1, for example. In this case, several nested containers are weighed substantially simultaneously and individually, either separately or in groups, using several mutually independent weighing cells of a weighing device. Additional apparatuses of the type in question are known from EP 2949353 B1, DE 102005014116 B4, or WO 2018/019985, for example. The containers are moved relative to the nest to be released onto the weighing cell for weighing in each case. The containers are then no longer or only partially located in the protective nest.

SUMMARY

In contrast, the apparatus according to the invention and the method according to the invention for weighing pharmaceutical containers nested in a carrier having the features of the independent claims have the advantage that pharmaceutical containers are weighed in a simple and reliable manner, and the weight thereof is individually and simply detected, without increasing equipment requirements and without the containers having to be taken out of the nest. This is achieved according to the invention with the features of the independent claims by providing an apparatus and a method for weighing pharmaceutical containers nested in a carrier, wherein a plurality of the nested containers can remain in the carrier or nest because a receptacle for the carrier is connected to a weighing station, in particular having at least one weighing cell, for weight detection. Removing the containers and handling them with automated grippers is a process that can occasionally require manual intervention. Using the solution according to the invention, the likelihood of such manual interventions can be reduced further because, according to the invention, the containers no longer have to be removed from the carrier, nest, or tray for weighing and can remain in their protective outer packaging, the carrier, throughout processing instead. Processes are simplified due to the solution according to the invention. Furthermore, an associated filling machine with filling weight control can have a much simpler design since no lifters for the containers and no container grippers are required. Processes susceptible to errors, such as the handling of individual containers, are no longer necessary. Furthermore, the apparatus according to the invention is characterized by a small space requirement, which is a significant cost advantage, especially in the clean rooms of the pharmaceutical industry. Another advantage of the system described is that the risk of packaging damage is avoided because the containers do not have to be removed from the protective outer packaging, the carrier. The risk of glass breakage when the containers are removed, which can be avoided according to the invention, is considered critical both by pharmaceutical manufacturers and by the relevant licensing authorities.

In an expedient development, a weighing station comprises at least one weighing cell which is connected to the receptacle at least via a stem. The weighing station particularly preferably comprises two weighing cells, preferably on opposite sides of the receptacle. As a result, weighing cells can be used with better weighing accuracy, although the weighing range would be too small for the entire mass that has be weighed. The accuracy of the weight detection can be improved in this way.

In an expedient development, the container remains in the carrier during weighing. In this way, damage that may occur during removal can be avoided.

In an expedient development, at least one filling station is provided which fills at least one container, in particular only a single container, when the container is located in the carrier and the carrier is located in the receptacle. In this way, in-process control of the filling weight can be implemented, with it being possible for all filled containers to be consecutively checked for the correct weight. Only one weighing station is required to determine the filling weight of a filled container from the tare weight and the gross weight.

For this purpose, in a particularly expedient manner, the weighing station determines a weight before the container is filled and a weight after the container has been filled and/or determines a weight after an additional container has been filled. After a container has been filled, the detected gross weight forms the tare weight of the next container to be filled, without the need for an additional measuring step. This simplifies and speeds up the weight determination process.

In an expedient development, the filling station comprises at least one arm, in particular a robot arm, which moves at least one filling needle for filling a container. This increases the flexibility in the choice of filling points. Moreover, and particularly conveniently, an arm, in particular a robot arm, can be programmed in such a way that low laminar air flows are generated when moving from one filling point to the next. This reduces particle motion and is therefore particularly preferred from a pharmaceutical point of view.

Additional expedient developments can be found in additional dependent claims and in the description.

BRIEF DESCRIPTION OF THE DRAWINGS

Embodiments of the invention are described in detail with reference to the accompanying drawings.

DETAILED DESCRIPTION

Embodiments of the invention are described in detail below with reference to FIGS. 1 and 2.

Figure 1:
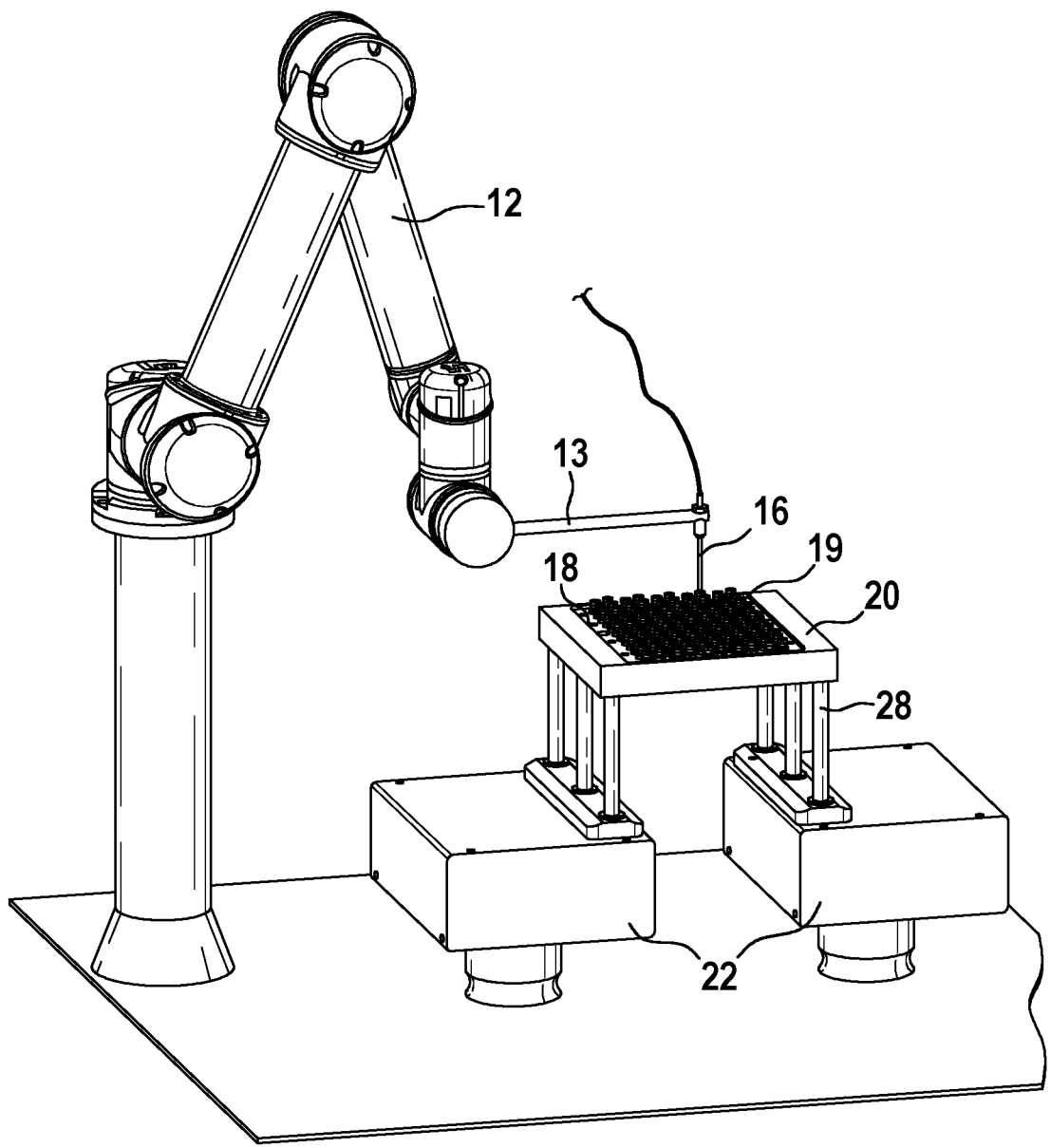
FIG. 1 shows, in a perspective side view, an embodiment of the apparatus according to the invention for weighing pharmaceutical containers nested in a carrier.
Figure 2:
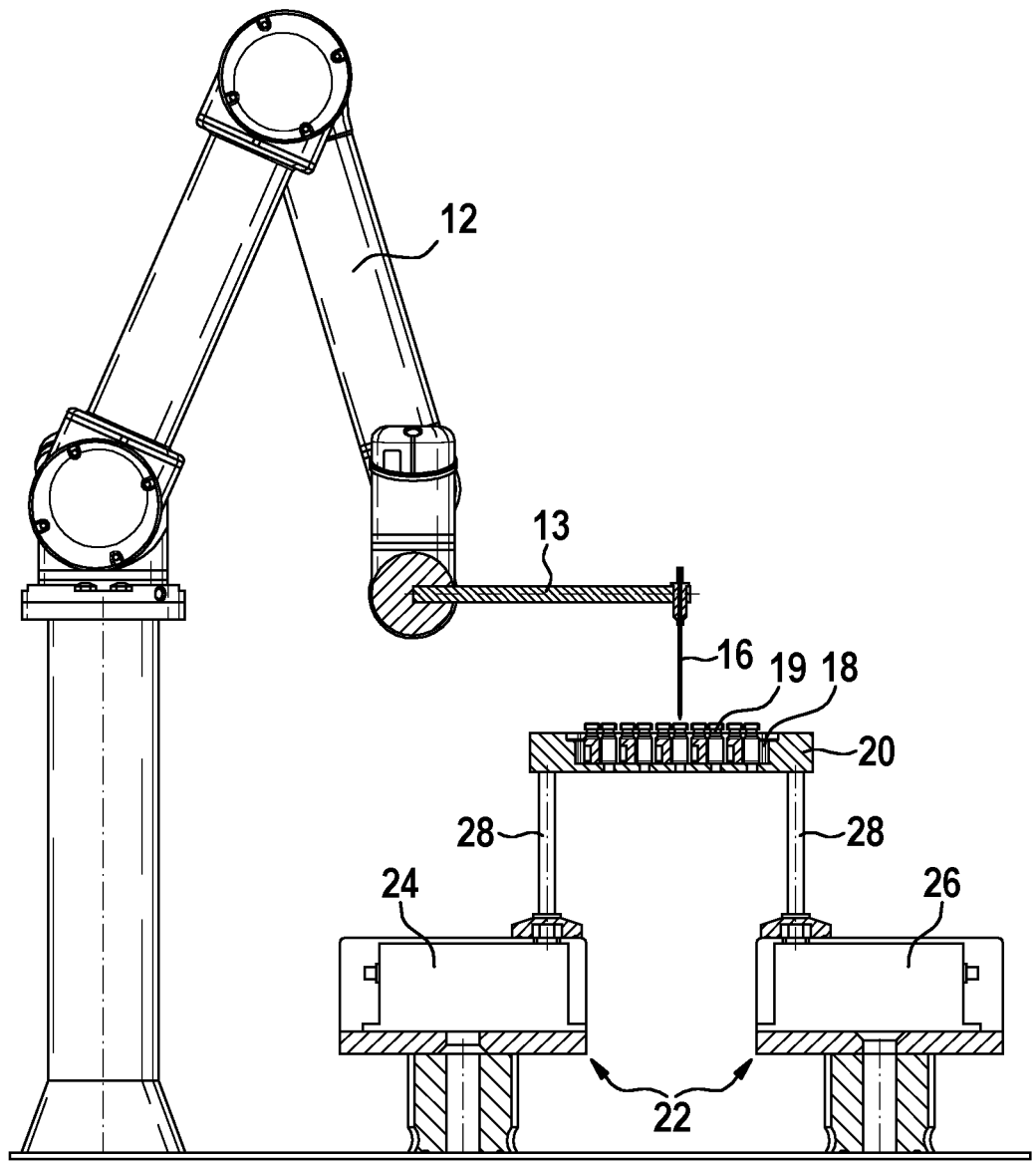
FIG. 2 shows a section through the apparatus according to FIG. 1.

FIG. 1 shows, in a perspective side view, an embodiment of the apparatus 10 for filling pharmaceutical containers 19 nested in a carrier 18 using an embodiment of the apparatus 22 according to the invention for weighing. The apparatus 10 for filling is hereinafter also referred to as filling station 10. Accordingly, the apparatus 22 for weighing is also referred to as weighing station 22.

The filling station 10 according to the present invention has, in addition to the weighing station 22, a filling unit 15 which comprises at least one filling needle 16 and a tube 14 for supplying the medium to be used for filling, such as pharmaceuticals.

The filling unit 15 or filling needle 16 can be raised and lowered with respect to the carrier 18 and the pharmaceutical containers 19 contained therein by means of a robot arm 12.

The carrier 18 shown in FIG. 1 for receiving the pharmaceutical containers 19 consists of a carrier body. Recesses, which extend through the entire carrier body and into which the pharmaceutical containers 19 can be received so as to fully penetrate said recesses, are formed, the pharmaceutical containers 19 being supported by their shape on respective seats on the upper face of the carrier body so that they do not fall through the carrier 18.

The carrier 18, together with the containers 19, is arranged in a receptacle 20. The receptacle 20 is designed as a holding frame, for example, and surrounds the carrier 18, in particular in order to interlockingly receive and hold said carrier. For this purpose, the receptacle 20 has a corresponding recess so that the carrier 18 can be introduced into the receptacle 20 from above and set down. The carrier 18 is designed to be slightly widened on at least one side, preferably on two sides. The receptacle 20 is connected to a weighing station 22. This is brought about via at least one stem 28, for example, which interacts with at least one weighing cell 24, 26 of the weighing station 22 for the purpose of weight detection. In the embodiment, the weighing station 22 comprises two weighing cells 24. The two outer sides of the receptacle 20, which enclose the carrier 18, are connected to the two weighing cells 24, 26, respectively, via corresponding stems 28. A plurality of weighing cells 24, 26 is used so that weighing cells 24, 26 can be used with better weighing accuracy, although the weighing range would be too small for the entire mass that has be weighed. At least one stem 28 is provided for connecting one side of the receptacle 20 to a respective weighing cell 24, 26. A plurality of stems 28 is preferably provided for connecting one side of the receptacle 20 to a respective weighing cell 24, 26; in the embodiment, respectively three stems 28 are provided on one side by way of example.

These and other features and characteristics of the present invention are explained in more detail with reference to the following statements:

The entire carrier 18, together with the containers 19 placed therein, is placed on the receptacle 20 by means of a suitable transport apparatus. The transport apparatus detaches itself from the carrier 18, so that the weight of the carrier 18 and that of the containers 19 arranged therein act on the receptacle 20 and thus on the weighing station 22.

The next processing step then takes place there. As already described, the receptacle 20 is connected to the weighing station 22 or to the associated weighing cells 24, 26 for weight detection. First, the weighing station 22 detects the tare weight. The tare weight thus includes the weight of the carrier 18 as well as the weight of all the containers 19 located in the carrier 18, all of which are empty before the first filling process.

A single container 19 is then filled with a medicine, for example. The weighing station 22 then determines the gross weight. The gross weight thus includes the weight of the carrier 18 as well as the weight of all the containers 19 located in the carrier 18, one of which is filled after a first filling process.

The difference between the gross weight and the tare weight gives the filling weight. The determined gross weight (from the previous filling) can be used as the tare weight for the subsequent filling. This is followed by the subsequent filling of an additional container 19. Again, the gross weight is determined after the subsequent filling of the additional container 19. The difference between the current gross weight and the previous gross weight gives the filling weight of the filling of the additional container 19.

The aforementioned process is repeated for each additional container 19 to be filled until all of the containers 19 of the carrier 18 have been filled and weighed. Usually, all of the containers 19 are filled, but it could be that not all of the containers 19 are filled.

It should be noted that the containers 19 always remain in the carrier 18, even during weighing, i.e. they are not released, lifted, etc. Each determined filling weight is checked to see whether it corresponds to a target filling weight. In the event of unacceptable deviations, countermeasures are introduced, for example discharging incorrectly filled containers 19 and/or issuing appropriate warning notices, including for checking the filling station 10, for example. If a container has not been filled enough, the missing filling quantity can be metered in instead of discharging the equipment container 19. It is also possible to use it to implement a weighing and metering function. This function determines the filling quantity using the weighing result. When the target weight is reached, the filling is ended.

The filling of the containers 19 in the carrier 18 can take place, for example, using a suitably programmed arm, for example the robot arm 12. This arm is designed, or the movement path is programmed, in such a way that the laminar air flow is disturbed as little as possible. This increases the safety of the arrangement because fewer particles are moved.

The filled containers 19 are only closed in a subsequent step since the weight of the closures could distort the weighing result on the weighing station 22. Thus, the carrier 18 with filled containers 19 is removed from the receptacle 20 and brought to a closing station. The containers 19 are closed at the closing station. Alternatively, it is also possible to close each container 19 directly after filling. It is then only necessary to determine a new tare value before the next filling takes place.

Using the system described, a filling machine with in-process filling weight control (IPC) can have a much simpler design, since no lifters and container grippers are required. Processes susceptible to errors, such as the handling of individual containers 19, can be omitted. This is achieved by adding the carrier 18 and the other containers 19 to the tare and gross weights of the container 19 to be filled.

The system described is particularly suitable for single-lane filling machines for low output since consecutive individual fillings are required and a plurality of containers 19 cannot be filled in parallel.

The present invention also relates in particular to determining the filling weight of pre-filled syringes, vials, or cartridges as containers 19, e.g. according to DIN-ISO 11040-4, which have already been cleaned and sterilized, e.g. fed to a filling machine 10 in a packaging according to DIN-ISO 11040-7. In this case, a plurality of containers 19 is nested in a plastics carrier plate acting as the carrier 18, which is also called a nest or tray, where they are arranged in a plurality of rows. Other preconfigured container shapes in carrier plates or magazines are also suitable.

For the IPC of such containers 19, the present invention is based on systems in which the containers do not have to be removed from the nest or released for weighing.

The weighing can take place before a vessel closure, a plunger stopper, or the like is inserted, as these components would distort the result due to their additional weight. Alternatively, it is also possible to close each container 19 directly after filling. It is then only necessary to determine a new tare value before the next filling takes place. The additional weight of the closure is thus taken into account.

Since the weighing process takes place directly under the filling point, the known methods for avoiding loss of filling material during filling in the carrier 18 or nest can also be used.

A filling machine 10 according to the invention therefore also requires less space, which is a significant cost issue in the clean rooms of the pharmaceutical industry.

Furthermore, using the system described, it is easy to weigh all the containers 10 or syringes, rather than just a random sample. This is achieved by the short weighing time described above. This can be called 100% IPC.

Another advantage of the system described is that the risk of damage to the packaging is avoided because the containers 10 do not have to be lifted out of the protective nest 40. The risk of glass breakage when the container 10 is removed is considered critical both by pharmaceutical manufacturers and by the FDA.

Even if the present invention referred to syringes, the process and system according to the invention would be able to handle and weigh any nested pharmaceutical containers, for example vials, ampoules or cartridges, in the same way, if necessary by means of suitable format parts.

What is claimed is:

1. An apparatus for weighing pharmaceutical containers (19) nested in a carrier (18), comprising at least one weighing device (22), wherein at least one receptacle (20) is provided for the carrier (18) of the containers (19), wherein the receptacle (20) is connected to the at least one weighing device (22) for weight detection of the receptacle (20), the carrier (18), and the containers (19), wherein the at least one weighing device (22) comprises at least one weighing cell (24, 26) which is connected to the receptacle (20) at least via a stem (28).

2. The apparatus according to claim 1, wherein the at least one weighing device (22) comprises at least two or more weighing cells (24, 26) which are each connected to the receptacle (20) via the at least one stem (28).

3. The apparatus according to claim 2, wherein the at least two or more weighing cells (24, 26) include a first weighing cell (24) and a second weighing cell (26), wherein the first weighing cell (24) is associated with at least one first stem (28) at a first side of the receptacle (20) and wherein the second weighing cell (26) is associated with at least one second stem (28) at a second side of the receptacle (20) opposite the first side.

4. The apparatus according to claim 1, wherein all of the containers (19) remain seated within the carrier (18) during weighing.

5. The apparatus according to claim 1, wherein at least one filling station (10) is provided which fills at least one container (19) when the container (19) is located in the carrier (18) and the carrier (18) is located in the receptacle (20).

6. The apparatus according to claim 5, wherein the at least one weighing device (22) determines a weight before filling the container (19) and/or a weight after filling the container (19) and/or a weight after filling an additional container (19).

7. The apparatus according to claim 5, wherein the filling station (10) comprises at least one arm, which moves at least one filling needle (16) for filling a container (19).

8. The apparatus according to claim 7, wherein the at least one arm is a robot arm (12).

9. A method for weighing pharmaceutical containers (19) nested in a carrier (18), comprising the following steps:
    the carrier (18), together with containers (19) to be filled located therein, is brought into a receptacle (20), wherein the receptacle is connected to a weighing station (22) for weight detection of the receptacle (20), the carrier (18), and the containers (19), and wherein the weighing station (22) comprises at least one weighing cell (24, 26) which is connected to the receptacle (20) at least via a stem (28), and
    when the carrier (18) is located in the receptacle (20), the weighing station (22) detects the weight.

10. The method according to claim 9, wherein a container (19) is filled and the weighing station (22) then detects the weight.

11. The method according to claim 10, wherein an additional container (19) is filled and the weighing station (22) detects the weight after the filling.

12. The method according to claim 10, wherein a filling weight is determined from the weight determined after filling the container (19) and from the weight determined before filling the container (19).

13. The method according to claim 10, wherein a filling weight of an additional container (19) is determined on the basis of a weight which is determined for a previously filled container (19).

14. The method according to claim 9, wherein after a last container (19) arranged in the carrier (18) has been filled, at least one container (19) is closed.

15. The method according to claim 14, wherein before and/or after the container (19) is closed, the weight is determined and/or an additional container (19) is filled and/or closed and the weight of the additional container (19) is determined.

16. The method according to claim 9, wherein the weighing station (22) detects the weight of the carrier (18) and all the containers (19) located in the carrier (18) when the carrier (18) is located in the receptacle (20).

* * * * *